United States Patent [19]

Wall

[11] Patent Number: 4,722,308

[45] Date of Patent: Feb. 2, 1988

[54] ENGINE WITH SPLIT CRANKSHAFT AND CRANKSHAFT HALF DISABLING MEANS

[76] Inventor: Robert A. Wall, 925 S. 7th, Okanogan, Wash. 98840

[21] Appl. No.: 860,468

[22] Filed: May 7, 1986

[51] Int. Cl.⁴ .................... F02D 13/06; F16F 15/24
[52] U.S. Cl. ...................... 123/198 F; 123/192 B; 74/603; 74/604
[58] Field of Search .............. 123/198 F, 192 B; 60/718; 74/603, 604

[56] References Cited

U.S. PATENT DOCUMENTS

| | | | |
|---|---|---|---|
| 2,527,424 | 10/1950 | Johansson | 60/718 |
| 4,069,803 | 1/1978 | Cataldo | 123/198 F |
| 4,367,703 | 1/1983 | Maucher et al. | 123/198 F |
| 4,367,704 | 1/1983 | Mauchen et al. | 123/198 F |
| 4,373,481 | 2/1983 | Kruger | 123/198 F |
| 4,394,854 | 7/1983 | Huber | 123/198 F |

*Primary Examiner*—Ira S. Lazarus

*Attorney, Agent, or Firm*—Harvey B. Jacobson

[57] ABSTRACT

An engine block is provided including multiple cylinders having pistons reciprocal therein connected to separate crankshaft sections journalled from the block by connecting rods. The block also journals a countershaft to whose opposite ends the crankshaft sections are drivingly connected through the utilization of power transmitting assemblies each including a clutch assembly and releasable drive connection structure incorporating and indexing mechanism for indexing the corresponding shaft section to the countershaft in the same indexed position each time the corresponding clutch assembly is actuated. The clutch assembly of each power transmitting assembly is interposed, in the path of transmission of power from the corresponding crankshaft section to said countershaft, intermediate the crankshaft section and the corresponding drive connection structure.

4 Claims, 7 Drawing Figures

ENGINE WITH SPLIT CRANKSHAFT AND CRANKSHAFT HALF DISABLING MEANS

BACKGROUND OF THE INVENTION

1. Field of the Invention

This invention relates to a reciprocating piston internal combustion engine including separate crankshaft end sections to which reciprocating pistons of the engine are connected by connecting rods. The crankshaft end sections are each drivingly connected to a countershaft through a releasable indexing drive connection and the countershaft is in turn drivingly connected to the cam shaft of the engine.

Prior patents disclosing similar structures are classified in Class 123, subclasses 52 A, 58 AB, 198 F and DIG. 7.

2. Description of Related Art

Examples of previously known structures including some of the general structural and operational features of the instant invention are disclosed in U.S. Pat. Nos. 861,205, 4,069,839, 4,389,985, 4,394,854 and 4,399,784.

However, the structures disclosed in the above-mentioned patents do not utilize the combination of structural features incorporated in the instant invention to provide a reciprocating piston internal combustion engine which may be conveniently operated on either of two different sets of cylinders in the improved manner disclosed.

SUMMARY OF THE INVENTION

The engine of the instant invention incorporates a pair of crankshaft end sections each having a pair of reciprocal pistons of a four cylinder engine drivingly connected thereto by the utilization of conventional connecting rods and the remote ends of the crankshaft sections are drivingly connected to a countershaft through the utilization of drive means each incorporating a releasable indexing drive connection and a releasable clutch assembly. The countershaft is in turn drivingly connected to the cam shaft of the engine for actuation of the intake and exhaust valves thereof.

The main object of this invention is to provide a multicylinder reciprocating piston internal combustion engine which may be operated on all cylinders of the engine or on either half the number of cylinders of the engine.

Another important object of the invention is to provide a combustion engine constructed in a manner whereby either half of the cylinders of the engine may be deactivated insofar as producing power while allowing only the other half of the cylinders of the engine to produce power.

A still further object of this invention is to provide a combustion engine in accordance with the preceding objects and constructed in a manner whereby the pistons in the deactivated cylinders of the engine are maintained stationary.

A final object of this invention is to be specifically enumerated herein is to provide a combustion engine in accordance with the preceding objects and which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, where like numerals refer to like parts throughout.

DESCRIPTION OF THE PREFERRED EMBODIMENTS

Figure 1:
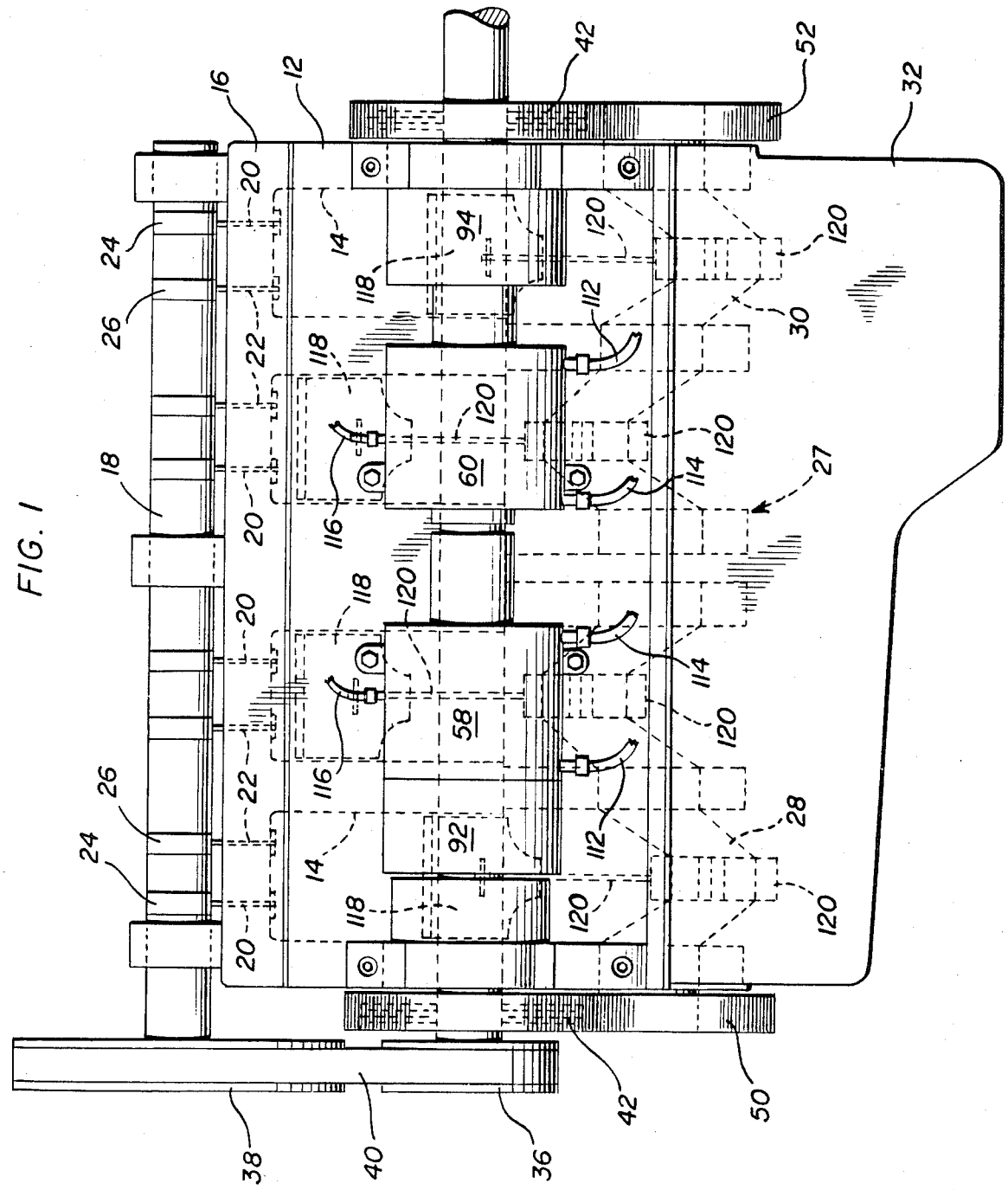
FIG. 1 is a partially schematic side elevational view of a combustion engine constructed in accordance with the present invention.

Referring now more specifically to the drawings, the numeral 10 generally designates a reciprocating piston internal combustion engine including a block 12 defining four piston bores or cylinders 14 closed at their upper ends by a cylinder head 16 journalling a cam shaft 18 therefrom. The head 16 includes intake and exhaust valves 20 and 22 of the spring closed poppet type with which lobes 24 and 26 of the cam shaft 18 are operatively engaged for opening the valves 20 and 22. Of course, the intake and exhaust valves control the flow of intake and exhaust gases into and from the cylinders 14 through corresponding intake and exhaust passages (not shown) formed in the head 16.

The block 12 journals crankshaft structure referred to in general by the reference numeral 27 from the lower end thereof and the crankshaft structure 27 includes a pair of opposite end crankshaft sections 28 and 30 independently rotatable relative to the block 12. The lower end of the block is closed by the usual pan 32 and the engine further journals a countershaft 34 therefrom. The forward end of the countershaft 34 has a toothed pulley 36 mounted thereon and the forward end of the cam shaft 18 has a toothed pulley 38 mounted thereon whose circumference is twice the circumference of the pulley 36. An endless flexible toothed belt (or chain) 40 drivingly connects the pulley 36 to the pulley 38.

Front and rear driven gears 42 and 44 are journalled from the block 12 by bearings 46 and 48 and the front and rear ends of the front and rear crankshaft sections 28 and 30 include gear wheels 50 and 52 mounted thereon meshed with the gears 42 and 44. The gears 44 rotatably receive the opposite ends of the countershaft 34 therethrough and the gears 42 and 44 include clutch assemblies 54 and 56 which are remotely operable and of any suitable type. The clutch assemblies 54 and 56 may be actuated to clutch or drivingly connect the gears 42 and 44 to the shaft 34 or deactuated to allow relative rotation between the gears 42 and 44 and the shaft 34.

The cylinder portions 58 and 60 of a pair of double acting hydraulic cylinders 62 and 64 are stationarily mounted from the block 12 and include piston sleeves 66 and 68 extending therethrough equipped with piston portions 70 and 72 as well as spool portions 74 and 76. The cylinder portions 58 and 60 include seals 78 establishing fluid-tight seals between the cylinder portions 58 and 60 and the piston sleeves 66 and 68 and the shaft 34 is rotatably received through the piston sleeves 66 and 68 and has opposite end splines 80 and 82 thereon.

Figure 3:
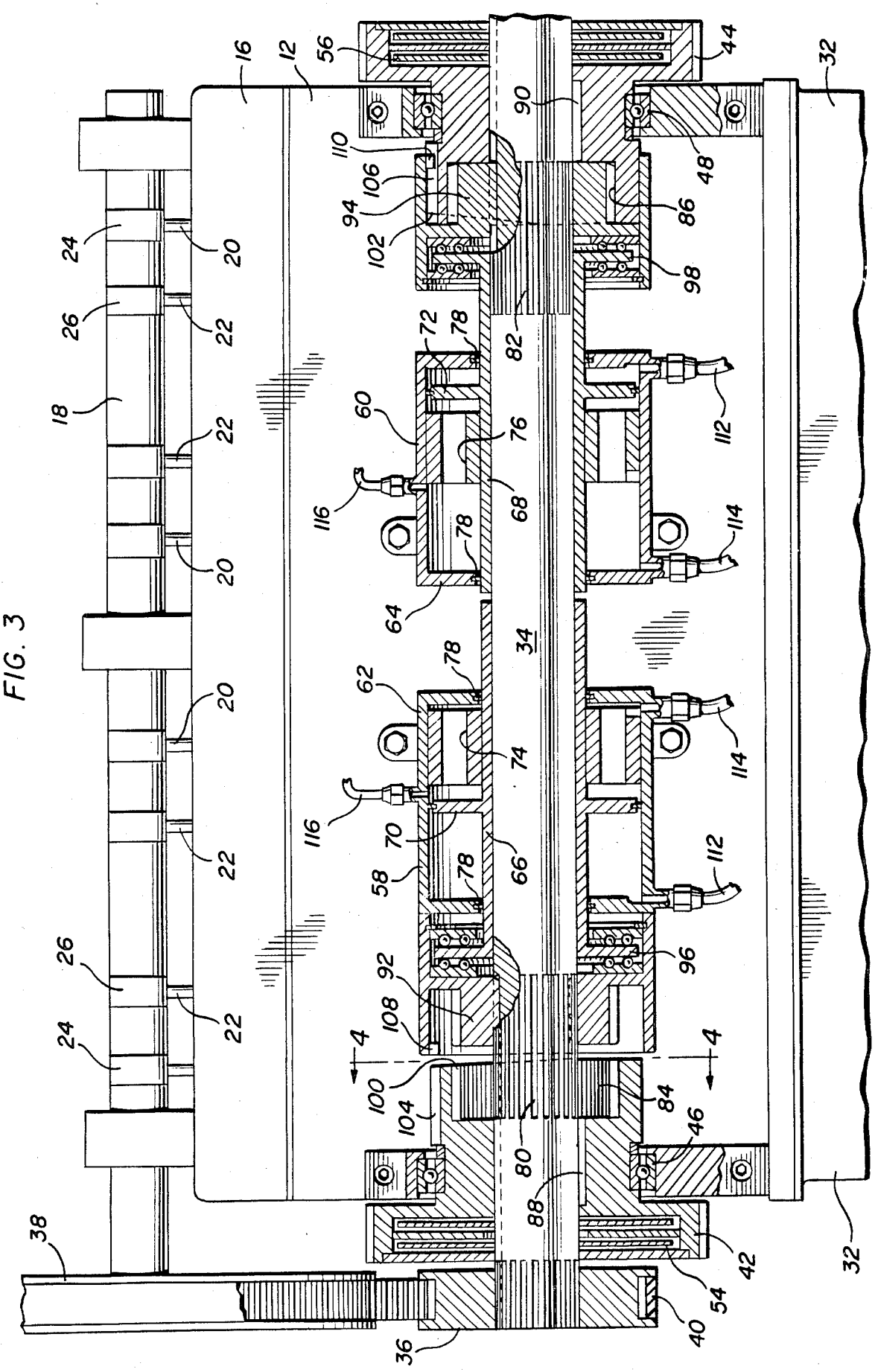
FIG. 3 is an enlarged fragmentary longitudinal vertical sectional view taken substantially upon the plane indicated by the section line 3—3 of FIG. 2.

As may best be seen from FIG. 3, the gears 42 and 44 include inner end recesses which are provided with inner gear teeth as at 84 and 86 and the gears 42 and 44 are splined to the shaft 34 as at 88 and 90.

A pair of slide gears 92 and 94 are internally splined and slidably engaged with the splines 80 and 82 on the shaft 34. The slide gears are connected to the piston sleeves 66 and 68 through thrust bearings 96 and 98 and are axially displaceable into meshed engagement with the gear teeth 84 and 86. In addition, the inner ends of the gears 42 and 44 include ramp surfaces 100 and 102 and the gears 42 and 44 include outer keyways 104 and 106 which open outwardly through the ramp surfaces 100 and 102 and in which key lugs 108 and 110 carried by the gears 42 and 44 are receivable.

Combined fluid pressure inlet and fluid pressure return lines 112 and 114 open into opposite ends of each of the cylinder portions 58 and 60 and a fluid pressure bleed line 116 opens outwardly of each cylinder portion 58. The lines 112, 114 and 116 extend to any suitable source of hydraulic fluid under pressure and an associated hydraulic fluid reservoir (not shown). In addition, the clutch assemblies 54 and 56 may be of any suitable type that may be remotely actuated.

In operation, and assuming the previously described moving parts of the engine 10 are as illustrated in FIG. 3 of the drawings, the engine 10 is being operated only by the two rear cylinders or bores 14 and the pistons 118 disposed therein are connected to the rear crankshaft section 30 by connecting rods 120. Each front and rear pair of cylinders or bores 14 is provided with its own air and fuel induction system (not shown) and its own exhaust gas system (not shown).

Figure 2:
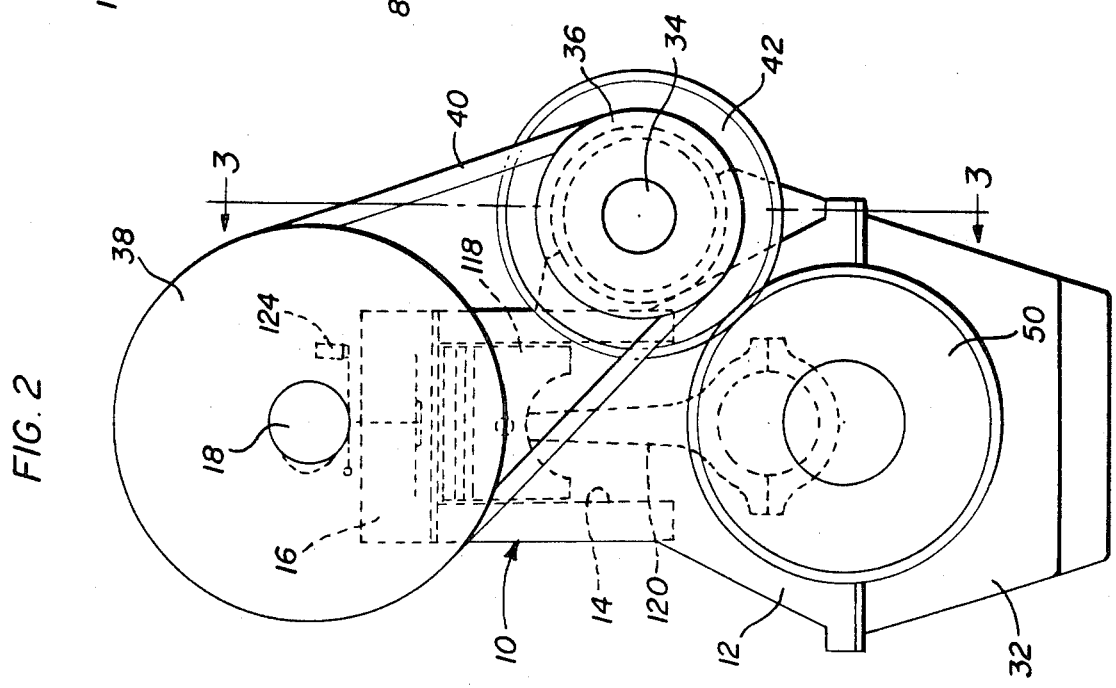
FIG. 2 is a front elevational view of the engine as seen from the left side of FIG. 1.

When it is desired to operate the engine 10 by all four cylinders or bores 14, the valves 20 and 22 for the front cylinders are held open by remotely operable hydraulic thrusters 124, see FIG. 2, operatively associated therewith. The front clutch assembly 54 is actuated to cause the front gear 42 to rotate at the same speed as the counter shaft 34. Then, the hydraulic cylinder 62 is actuated by admitting fluid under pressure into the cylinder portion 58 through line 114. The piston 70 moves to the left as viewed in FIG. 3 and thereby causes the key lug 108 to engage the ramp surface 110. As the key lug 108 engage the ramp surface 110 excess fluid pressure is bled off by bleed line 116 and the clutch assembly 54 is released to allow key 108 to align with keyway 104. As the key 108 enters keyway 104 bleed line 116 is covered by spool portion 74 and full fluid pressure is available to cause final movement of the piston portion 70 to the left and full meshed engagement of the gear 94 with the gear teeth 84. Then, fluid pressure to the cylinder portion 58 and the thrusters 124 is relieved and the fuel injectors for the front cylinders 14 may be actuated. The engine 10 may be provided with a mini computer (not shown) for proper timed sequential control over fluid pressure to the cylinder portions 58 and 60, the clutch assemblies 54 and 56, the thrusters 124 and the fuel injection (if provided) for the front and rear cylinders.

If it is then desired to disable one pair of the cylinders or bores 14, either clutch assembly 54 and 56 may be engaged and the corresponding cylinder 62 and 64 may be actuated to withdraw the corresponding slide gear 92 or 94 from engagement with the associated gear 42 or 44.

Figure 6:
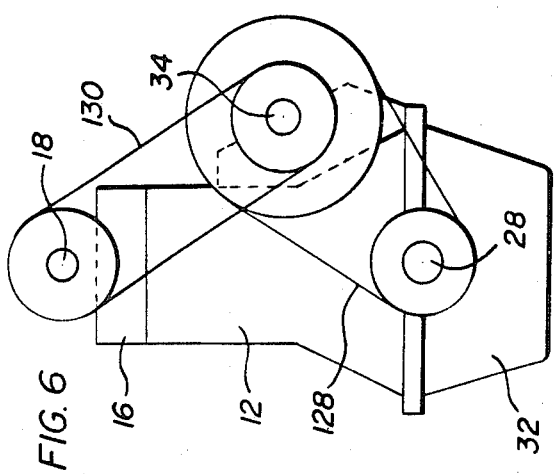
FIG. 6 is a schematic view illustrating a modified form of drive connection between the engine crankshaft, the engine counter shaft and the engine cam shaft.

With attention now invited more specifically to FIG. 6 of the drawings, it may be seen that the remote ends of the crankshaft sections 28 and 30 may be drivingly coupled to the corresponding ends of the countershaft 34 at a 2:1 ratio through the utilization of an endless flexible belt 128 and that the forward end of the countershaft 34 may be drivingly connected to the forward end of the cam shaft 18 by an endless flexible belt 130 at a ratio of 1:1.

Figure 7:
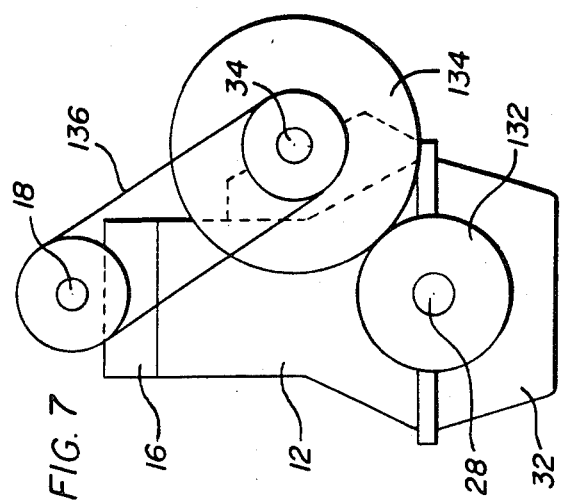
FIG. 7 is a schematic view illustrating a third form of drive connection between the engine crankshaft, the engine countershaft and the engine cam shaft.

On the other hand, with attention now invited more specifically to FIG. 7, the remote ends of the crankshaft sections 28 and 32 may be drivingly connected to the opposite ends of the countershaft 34 through the utilization of small and large gear wheels 132 and 134 mounted thereon at a 2:1 ratio and the forward end of the countershaft 34 may be drivingly connected to the forward end of the cam shaft 18 by an endless flexible belt 136 at a 1:1 ratio.

Figure 4:
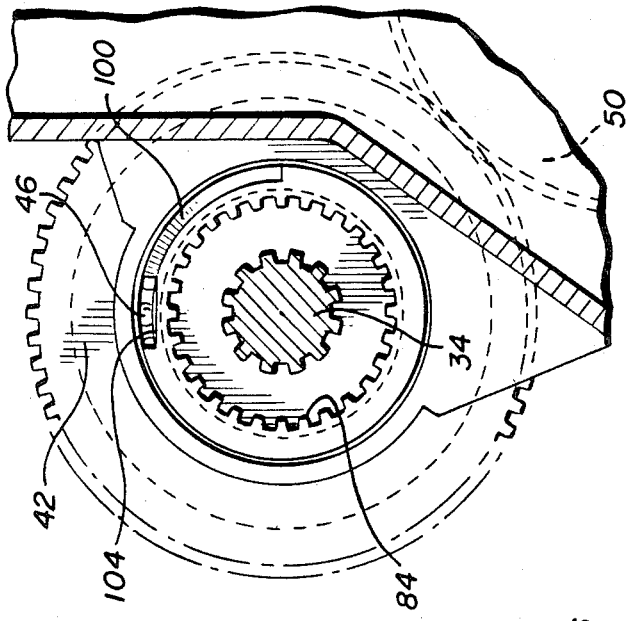
FIG. 4 is a fragmentary enlarged transverse vertical sectional view taken substantially upon the plane indicated by the section line 4—4 of FIG. 3.
Figure 5:
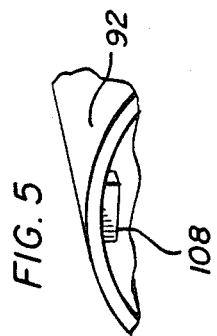
FIG. 5 is a fragmentary enlarged perspective view illustrating a portion of one of the indexing structures of the two drive connections between the countershaft of the engine and the corresponding crankshaft end.

From FIG. 4 of the drawings, it may be seen that the ramp surface 100 extends approximately 90° about the corresponding gear. However, the ramp surface could extend 180°, 270° or substantially 360° about the gear.

Also, it is important to note that the path of power transmission from each crankshaft section to the countershaft 34 is first through the corresponding clutch and then through the corresponding sliding gear which is in fixed angular displacement relative to the countershaft 34 and that the camshaft 18 is constantly driven from the countershaft 34. Accordingly, the camshaft is maintained in proper "time" with the crankshaft.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A block defining a plurality of piston bores each having a piston reciprocal therein, crankshaft means including two separate crankshaft sections journalled from said block, connecting rod means connecting at least one piston to each crankshaft section for reciprocation for said pistons responsive to rotation of said crankshaft sections, countershaft means journalled from said block, a pair of drive means each drivingly connecting a corresponding crankshaft section to said countershaft, at least one of said drive means including remotely operable clutch means for declutching and clutching the corresponding crankshaft section from and to said countershaft, respectively, and incorporating indexing means operative to automatically index said corresponding crankshaft section to said countershaft in the same indexed position each time said clutch means clutches said corresponding crankshaft section to said countershaft, said block comprising the block of an internal combustion engine and said engine including cylinder head means closing one set of corresponding ends of said bores, said cylinder head means including intake and exhaust ports opening into each cylinder and valve means for opening and closing the intake and exhaust ports of each cylinder in timed sequence with reciprocation of the corresponding piston, and driven actuator means for said valve means driven from said countershaft.

2. The block of claim 1 wherein each of said drive means includes clutch means for declutching and clutching the corresponding crankshaft section from and to said countershaft, respectively.

3. The block of claim 2 wherein each of said drive means includes a selectively releasable and engageable drive connection means, including the corresponding indexing means and in addition to and selectively operable independent of the corresponding clutch means, drivingly connecting the corresponding crankshaft section to said countershaft.

4. The block of claim 3 wherein said clutch means is interposed, in the path of transmission of power from the corresponding crankshaft section to said countershaft, intermediate the crankshaft section and the corresponding drive connection means.

* * * * *